Figure 1:
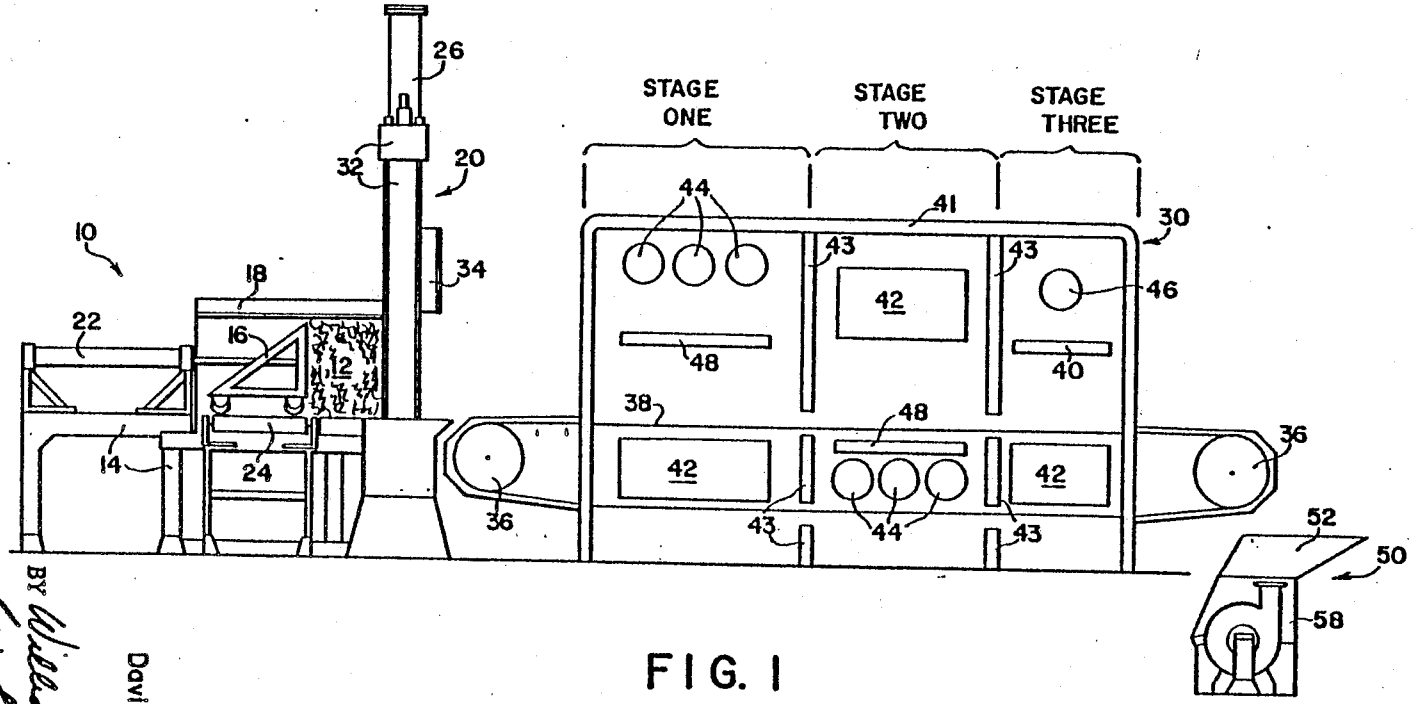
Figure 2:
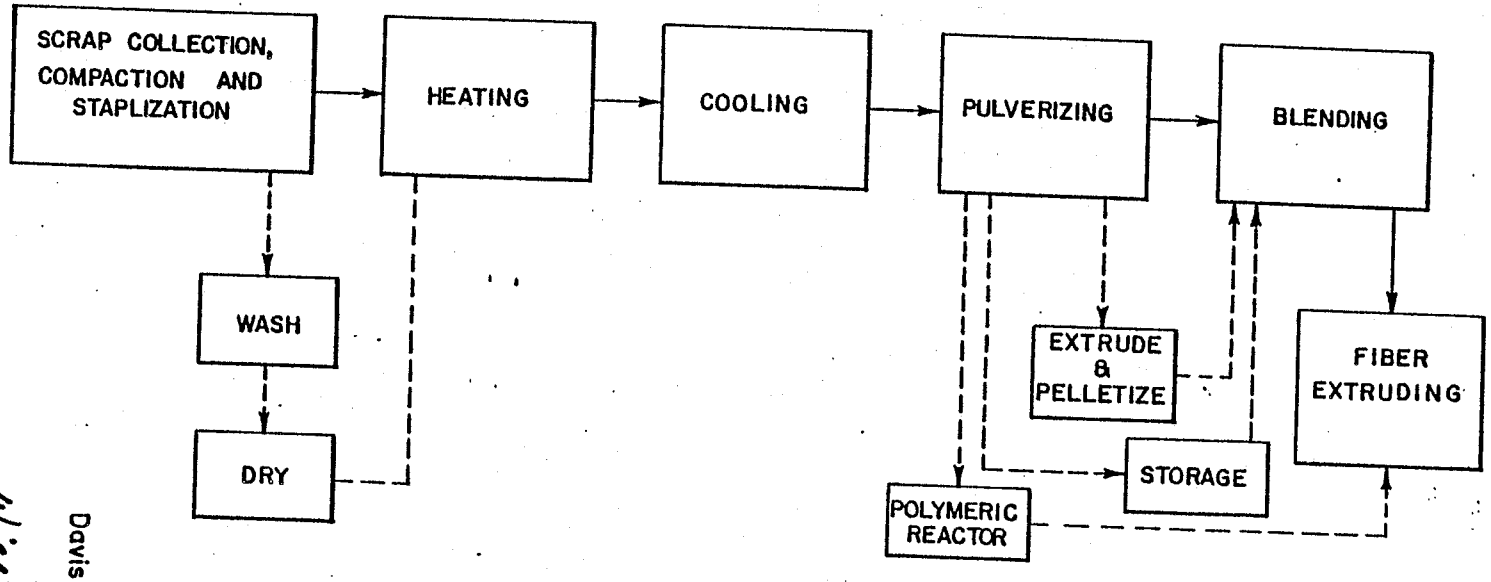

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 13, 1970

870 O.G. 393

T870,010
PROCESS FOR RECLAIMING POLYESTER SCRAP

Davis Franklin Ward, P.O. Box 511,
Kingsport, Tenn. 37662

Filed Mar. 4, 1968, Ser. No. 710,384
**Int. Cl. C08g *53/22***
U.S. Cl. 260—2.3
2 Sheets Drawing. 19 Pages Specification

A method and apparatus for reclaiming amorphous and oriented polyester scrap in such manner that the inherent viscosity value of the scrap is retained at a level enabling the reuse of the scrap in the production of top quality fibers. The scrap, to be reclaimed, is generally cut into long staple lengths, its temperature is raised close to the fiber melting point by treating with a hot, water-free, gaseous atmosphere, and the scrap is then cooled and pulverized preparatory for mixing with virgin polyester polymer.

Jan. 13, 1970 D. F. WARD T870,010

PROCESS FOR RECLAIMING POLYESTER SCRAP

Filed March 4, 1968 2 Sheets-Sheet 1

Tx ~~450~~ / ~~765~~
X ~~410~~ / ~~774~~
Tx 528 / 481
X 528 / 499

Added

Davis F. Ward
INVENTOR.

BY William T. French
Leigh R. Taylor
ATTORNEYS

PROCESS FOR RECLAIMING POLYESTER SCRAP

Filed March 4, 1968 2 Sheets-Sheet 2

Davis F. Ward
INVENTOR.

BY William T. French
Leigh B. Taylor
ATTORNEYS